Nov. 8, 1955
E. F. PAWSAT
2,723,133
BICYCLE STABILIZER AND ONE-PIECE
FRAME-AXLE MEMBER THEREFOR
Filed Sept. 3, 1954
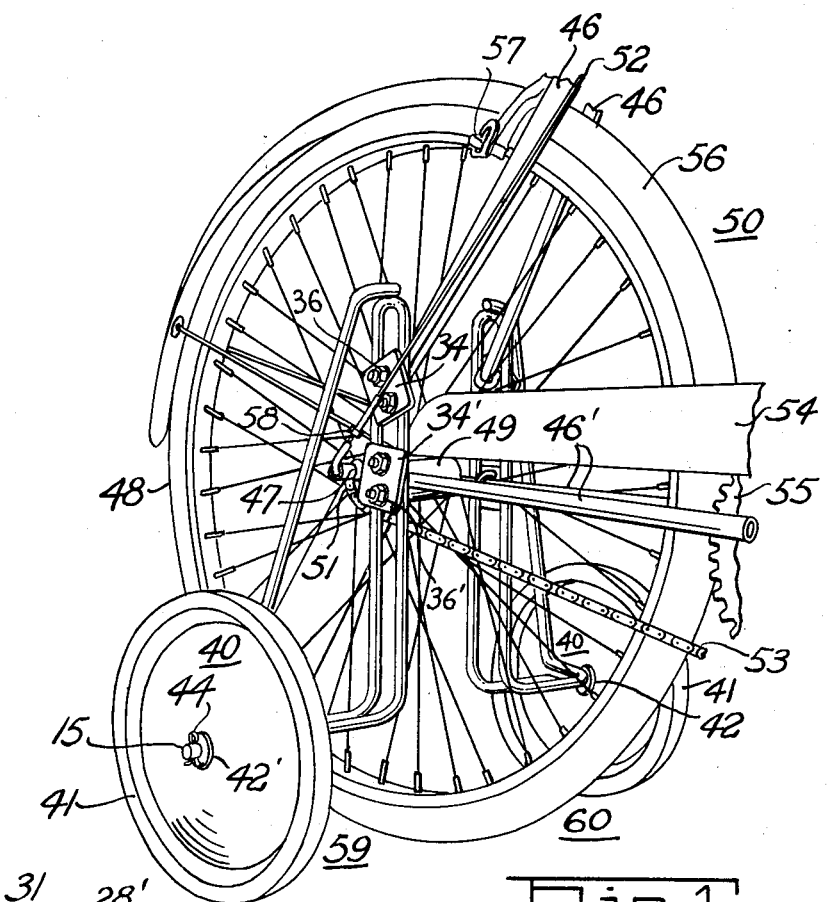
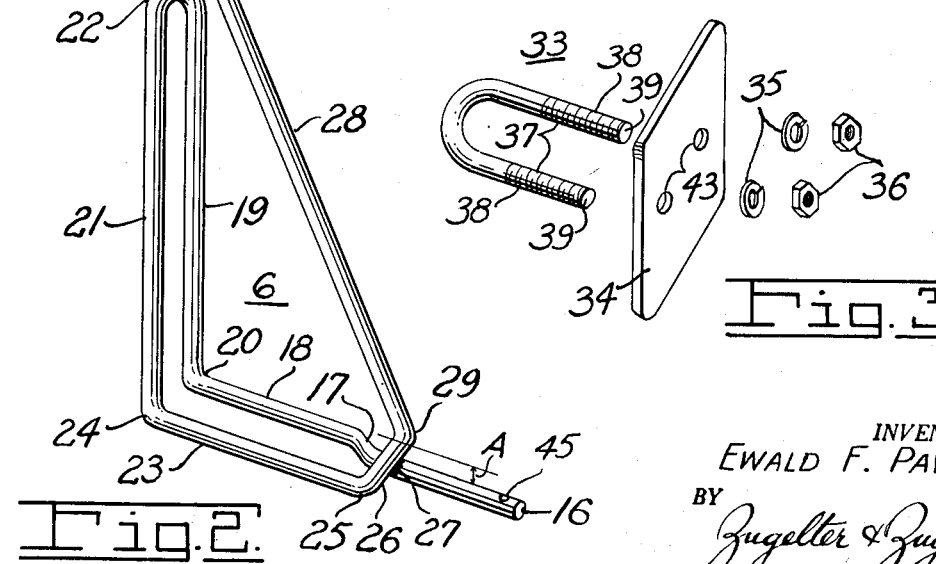
INVENTOR.
EWALD F. PAWSAT
BY
Zugelter & Zugelter
Attys.

United States Patent Office 2,723,133
Patented Nov. 8, 1955

2,723,133

BICYCLE STABILIZER AND ONE-PIECE FRAME-AXLE MEMBER THEREFOR

Ewald F. Pawsat, Maysville, Ky.

Application September 3, 1954, Serial No. 454,149

4 Claims. (Cl. 280—293)

This invention relates to bicycle stabilizers.

An object of this invention is to provide a bicycle stabilizer adapted for mounting upon bicycles generally, including light-weight bicycles having multi-speed rear axles.

Another object of this invention is to provide a bicycle having stabilizing means for the rear portion thereof.

Another object of this invention is to provide a bicycle stabilizer adapted to serve as a stirrup for a passenger.

A further object of this invention is to provide a strong, sturdy, light, unitary frame-axle unit which may be easily manufactured at low cost.

A further object of this invention is to provide such a device of a structure harmonious with that of light-weight bicycles.

Another object of this invention is to provide a bicycle stabilizer frame-axle unit fabricated from a single piece of elongate stock by bending and two welds to form a rigid frame having a projecting axle portion.

The above and other objects and features of this invention will be apparent to those having ordinary skill in this art from the following description taken in conjunction with the accompanying drawings, in which:

Figure 1 is a view in perspective of a pair of bicycle stabilizers embodying this invention and attached to the rear portion of a light-weight bicycle, portions of said bicycle being omitted;

Fig. 2 is a view in perspective of a frame-axle unit for a stabilizer embodying this invention; and Fig. 3 is an exploded view of a clamp unit for cooperatively securing a frame-axle unit of a stabilizer to a portion of the frame of a light-weight bicycle in operative relation thereto.

The device shown in the drawing presently appears to be a preferred form of bicycle stabilizer embodying this invention.

A one-piece frame-axle unit 6 is shown most clearly in Fig. 2. Frame-axle unit 6 is fabricated from a single piece of elongate stock which may, as shown, be of round cross-section. Axle portion 15 is straight and extends from a free end 16 to an offset portion 17 disposed intermediate axle portion 15 and a first base portion 18. The axes of base portion 18 and axle portion 15 are parallel and spaced apart a distance A. The distance A is normally less than or substantially equal to the diameter or cross-sectional thickness of the stock measured in the plane of the axes of portions 15 and 18. A first riser portion 19 is joined to base portion 18 by bend 20 in coplanar substantially perpendicular relation to sections 15 and 18. A second riser portion 21 joined to riser 19 by intervening U-bend portion 22 extends in spaced parallel relation to riser 19 with its axis lying in a plane substantially perpendicular to the plane of the axes of portions 15, 18, and 21. A second base portion 23 extends parallel to first base portion 18. The axes of portions 18 and 23 lie in a plane substantially perpendicular to both the plane of the axes of portions 15, 18, and 19, and to the plane of the axes of portions 19 and 21. Base portion 23, slightly longer than base portion 18, is joined by bend 24 to riser 21 and bend 25 to stop portion 26. Stop portion 26 extends transversely of axle portion 15 in superior relation thereto with its axis lying in the plane of the axes of base portions 18 and 23. Stop portion 26 is securely joined to axle portion 15 in a suitable manner, such as by welding or fusing them together as at 27. In the device shown in Fig. 2, portions 15 and 26 were joined by fusing same together at 27. An obtuse L-shaped brace portion 28 is joined by bend 29 to stop portion 26. As shown in Fig. 2, I prefer that the obtuse bend 30 is spaced from bend 29 and end 31 and is of such magnitude as to relate portion 28' of brace 28 in substantial parallelism to base portions 18 and 23. Portion 28' extends in transverse exterior tangency to the central portion of U-bend 22 with end 31 substantially flush with the coplanar surfaces of portions of 19, 21, and 22 remote from stop portion 26. As shown in Fig. 2, I prefer to join brace portions 28' to U-bend portion 22 at a point adjacent end 31 thereof by means similar to that used to secure portion 26 to axle portion 15, for example, welding or fusing them together at 32.

As shown in Fig. 1, a suitable ground-engaging wheel 40 may be mounted upon axle portion 15 for rotation. As shown, wheel 40 may have a rubber tire 41 and may preferably be disposed between a pair of washers 42 and 42'. Washer 42 is disposed between stop portion 26 and wheel 40, while washer 42' is disposed between wheel 40 and retaining means such as cotter pin 44 which extends through a suitable aperture 45 provided in axle portion 15 adjacent end 16 thereof.

In Fig. 3 I have shown an exploded view of means for mounting frame-axle unit upon a portion of a bicycle frame. The mounting means comprise a U-bolt 33, a clamp plate 34, a pair of lock washers 35 and a pair of nuts 36. As shown, the U-bolt 33 has a pair of parallel elongated leg portions 37 having threads 38 adjacent the free ends 39 thereof. The legs 37 are spaced apart a distance sufficient to receive a portion of a bicycle frame. Clamp plate 34 is a rigid rectangular plate having spaced apertures 43 adapted to receive portions of U-bolt legs 37.

In Fig. 1, I have shown a portion of a light weight bicycle which includes a pair of spaced inclined strut members 46 and a pair of horizontal strut members 46' forming portions of the frame of bicycle 50. A transverse axle 47 is mounted adjacent its ends respectively in the bicycle frame adjacent the laterally spaced junctures of the pairs of struts 46 and 46'. A wheel 48 having a hub 49 is mounted for rotation on the axle 47. The wheel hub-axle assembly is of the multi-speed type in which the effective drive ratio between gear 51 and wheel hub 49 is selected by means of an openable and adjustable linkage 52. Some of the other portions of the bicycle 50 appearing in Fig. 1 include chain 53, chain guard 54, portion of sprocket wheel 55, mud guard 56, and rim brake shoe 57.

The axle drive-ratio control linkage 52 may be opened by releasing clamp collar nut 58. After linkage 52 is opened, stabilizer 59 may be mounted upon the frame of bicycle 50, as shown in Fig. 1, as follows: U-bolt 33 is placed astride strut 46 with the legs 37 thereof projecting successively between risers 19 and 21, through apertures 43 (in clamp plate 34), lock washers 35, and into threaded engagement with nuts 36. Nuts 36 are suitably drawn up to firmly clamp portions of risers 19 and 20 between strut 46 and clamp plate 34. In similar manner portions of risers 19 and 21 spaced from clamp plate 34, are firmly clamped between strut 46' and plate 34'. Linkage 52 is then reassembled and secured in proper adjustment by tightening of nut 58. As shown in Fig. 1, reassembled linkage 52 extends through the frame-axle unit of stabilizer 59, but without contacting any portion thereof.

A second stabilizer 60 may be installed in similar manner.

Stabilizers 59 and 60 may be adjusted vertically relative to the bicycle supporting surface by loosening nuts 36 and 36', repositioning stabilizers 59 and 60 relative to bicycle frame portions 46 and 46' and thereafter tightening nuts 36 to effect reclamping of the stabilizer in fixed relation to the bicycle frame members.

The bicycle stabilizer illustrated in the drawing and described above is subject to structural modification without departing from the spirit and scope of the appended claims.

Having thus described my invention, what I claim as new and desire to secure by Letters Patent is:

1. A bicycle of the type having a frame including a pair of struts extending substantially horizontally rearward from adjacent the pedal sprocket bearing, a pair of inclined structs extending downwardly rearward from adjacent the seat post mount, the rearward end portion of each of said inclined struts being secured respectively to one of said horizontal struts adjacent the rearward end thereof, a rear axle mounted transversely on said frame adjacent the rearward ends of said struts, at least one stabilizing auxiliary frame-axle unit having a pair of spaced parallel riser portions, a plurality of U-bolts, a plurality of apertured clamp plates, a plurality of securing means, one of said U-bolts straddling one of said inclined structs and spaced from the rearward end thereof, the free legs of said U-bolt extending successively between the risers through one of said apertured clamp plates into engagement with securing means whereby said risers may be clamped in fixed relation to said inclined strut between said inclined strut and said clamp plate, a second one of said U-bolts spaced from the juncture of said inclined strut and the adjacent horizontal strut secured thereto, said second U-bolt straddling said horizontal strut with the legs thereof extending successively through a second one of said apertured clamp plates into engagement with securing means whereby said risers may be clamped in fixed relation to said horizontal strut between said second clamp plate and said horizontal strut for securing said frame-axle unit in operative relation to said bicycle with the axle portion of said unit extending substantially parallel to the rear axle of said bicycle, a wheel journaled for rotation on said axle-portion, and retaining means co-operating with said axle-portion for retaining said wheel thereon.

2. For a bicycle stabilizer a frame-axle unit comprising one piece of elongate stock having a U-bend portion intermediate its ends connecting two parallel riser portions, a pair of parallel base portion extensions extending substantially perpendicularly from said risers and remote from the U-bend portion, one of said base portion extensions having an offset portion spaced from said riser and extending away from said base portion and away from said U-bend portion to an axle portion extending parallel to said base portions, the second of said base portions having a stop portion extending from its end remote from the risers, coplanar with said base portions and transversely of said axle portion, a portion of said stop portion intermediate the ends thereof being in superior contacting relation to said axle portion adjacent said offset portion, said stop and axle portions being welded together at the point of contact, an obtuse-L-shaped brace portion extending from said stop portion to said U-bend portion, said brace portion being adjacent its end joined by welding in external tangential relation to the center of said U-bend portion.

3. A bicycle stabilizer for bicycles comprising a one-piece frame-axle unit, a wheel journaled for rotation on the axle portion thereof, means retaining said wheel on said axle portion and at least two clamp means for co-operatively securing said frame-axle unit to strut portions of a bicycle frame, said one-piece frame axle unit being one piece of elongate stock having a U-bend portion intermediate its ends connecting two parallel riser portions, a pair of parallel base portion extensions extending substantially perpendicularly from said risers and remote from the U-bend portion, one of said base portion extensions having an offset portion spaced from said riser and extending away from said base portion and away from said U-bend portion to an axle portion extending parallel to said base portions, the second of said base portions having a stop portion extending from its end remote from the risers, coplanar with said base portions and transversely of said axle portion, a portion of said stop portion intermediate the ends thereof being in superior contacting relation to said axle portion adjacent said offset portion, said stop and axle portions being joined together at the point of contact, an obtuse-L-shaped brace portion extending from said stop portion to said U-bend portion, said brace portion being adjacent its end joined in external tangential relation to the center of said U-bend portion, said clamp means each comprising a U-bolt adapted to straddle one strut of a bicycle frame at a point adjacent but spaced from the rear axle of said bicycle with the legs of said U-bolt extending successively through the space between the risers of the frame-axle unit through an apertured clamp plate into engagement with securing means disposed on the opposite ends of said risers.

4. A bicycle stabilizer for bicycles comprising a one-piece frame-axle unit having a pair of parallel riser portions joined by a U-bend portions at their upper ends, a pair of parallel base portions extending substantially perpendicular to said risers from the lower ends thereof, one of said base portions extending to a stop portion extending perpendicular thereto, the second base portion being joined by an offset portion to a parallel axle portion secured in subjacent relation to the stop portion and a brace portion extending from the end of the stop portion remote from the first base portion, said brace portion being secured to the U-bend portion adjacent its end remote from said stop portion, an auxiliary wheel journaled on said axle portions of said frame-axle unit for rotation, a pair of U-bolts, a pair of clamp-plates adapted to co-operate with said U-bolts and said frame-axle unit when said U-bolts are in engagement with respective portions of a bicycle frame adjacent but spaced from the rear axle thereof, said clamp-plates engaging said parallel riser portions to effect clamping of the frame-axle unit to the respective portions of a bicycle frame, whereby said auxiliary wheel is mounted for limiting lateral inclination of said bicycle.

References Cited in the file of this patent

UNITED STATES PATENTS

| | | |
|---|---|---|
| 661,145 | Hausmann | Nov. 6, 1900 |
| 1,384,300 | Buckland | July 12, 1921 |
| 2,694,582 | Reside | Nov. 16, 1954 |

FOREIGN PATENTS

| | | |
|---|---|---|
| 380,494 | Germany | Sept. 10, 1923 |